United States Patent Office 3,141,018
Patented July 14, 1964

---

3,141,018
PARA TERTIARY AMINO - ALKYLENE - AMINO-
BENZYLIDENE MALONONITRILES AND FUNC-
TIONAL DERIVATIVES THEREOF
James M. Straley, David J. Wallace, and John G. Fisher,
all of Kingsport, Tenn., assignors to Eastman Kodak
Company, Rochester, N.Y., a corporation of New
Jersey
No Drawing. Filed July 20, 1961, Ser. No. 125,343
6 Claims. (Cl. 260—247.2)

This invention relates to new methine dyestuffs and their application to the art of dyeing or coloring.

The new methine dyestuffs of our invention consist of the methine compounds having the formula:

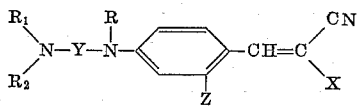

wherein R and $R_1$ each represents an alkyl radical having 1 to 4 carbon atoms, $R_2$ represents an alkyl radical having 1 to 4 carbon atoms or a β-cyanoethyl group, Y represents an alkylene radical having 2 to 4 carbon atoms, X represents a cyano group, a —$COOCH_2CH_2CN$ group or a —$COOR_3$ group, wherein $R_3$ represents an alkyl radical having 1 to 4 carbon atoms, Z represents a hydrogen atom or a methyl radical and wherein

collectively represents a morpholinyl radical or a piperidyl radical, and the quaternary ammonium salts of said methine compounds.

The non-quaternary methine compounds of our invention are prepared by condensing an aldehyde having the formula:

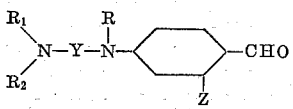

with an active methylene compound having the formula $NCCH_2X$. R, $R_1$, $R_2$, X, Y and Z as used here and throughout the specification have the meaning previously assigned to them.

The aldehydes used in the preparation of the methine compounds of our invention are readily obtained by the Vilsmeier reaction or modifications thereof. We prefer to use the $POCl_3$-dimethylformamide reaction with a suitable aniline derivative having an unsubstituted position para to the amine nitrogen atom. The reaction proceeds as indicated hereinafter.

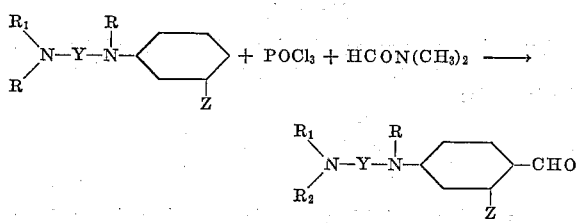

The quaternized methine compounds of our invention are readily obtained by quaternization of the non-quaternary methine compounds of our invention in accordance with customary quaternization procedures. Quaternization may be carried out in an inert solvent using the known quaternizing agents. A dialkyl sulfate, an alkyl chloride, an alkyl bromide, an alkyl iodide, an aralkyl chloride, an aralkyl bromide or an alkyl ester of para-toluene sulfonic acid, for example, can be employed.

Specific quaternizing agents include, for example, dimethyl sulfate, diethyl sulfate, dipropyl sulfate, dibutyl sulfate, ethyl bromide, ethyl chloride, methyl iodide, ethyl iodide, n-butyl iodide, lauryl iodide, benzyl chloride, benzyl bromide, methyl p-toluene sulfonate, ethyl p-toluene sulfonate, n-propyl p-toluene sulfonate and n-butyl p-toluene sulfonate.

Inert solvents that can be employed in the quaternization reaction include, for example, dimethyl formamide, acetone, ethylene glycol monoethyl ether, isopropanol, n-butanol, chlorobenzene and nitrobenzene.

Alternatively, the quaternary methine compounds of our invention can be prepared by quaternizing the aldehyde compounds having the formula:

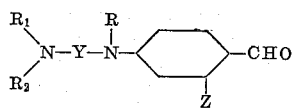

and condensing the quaternized aldehyde compounds obtained with the active methylene compounds having the formula: $NCCH_2X$.

The aniline derivatives having the formula:

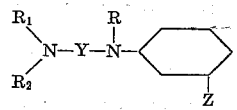

are prepared by reaction the compounds having the formula:

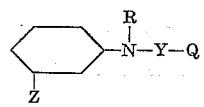

wherein R, Y and Z have the meaning previously assigned to them and Q represents a chlorine atom or a bromine atom with an amine having the formula:

When

collectively, is a morpholinyl radical or a piperidyl radical morpholine and piperidine, respectively, are employed.

The new methine compounds of our invention are valuable dyestuffs for various synthetic textile materials. The quaternary methine compounds dye polyacrylonitrile and modified polyacrylonitrile textile materials fast, bright yellow shades. The quaternary methine compounds have good affinity for the aforesaid textile materials and yield bright yellow dyeings thereon which have good fastness to light, gas, sublimation and wet processing. Wet processing includes, for example, washing, perspiration, wet ironing and wet sublimation.

The non-quaternary methine compounds of our invention have good affinity for polyacrylonitrile, modified polyacrylonitrile, cellulose ester and polyester textile materials and dye these materials bright yellow shades having good fastness to light and gas.

Kodel modacrylic fibers, Orlon 42, Verel, Dacron and Acrilan are illustrative of the acrylic, modacrylic and polyester textile materials that can be dyed with the new methine compounds of our invention. Cellulose esters that can be dyed include, for example, cellulose acetate, cellulose propionate, cellulose butyrate, cellulose acetate-propionate and cellulose acetate-butyrate.

Malononitrile, β-cyanoethyl, cyanoacetate, methyl cyanoacetate, ethyl cyanoacetate, n-propyl cyanoacetate, isopropyl cyanoacetate, n-butyl cyanoacetate and tertiary-butyl cyanoacetate are illustrative of the active methylene compounds used in the preparation of the new methine compounds of our invention.

p-(N-methyl-N-dimethylaminoethylamino)benzaldehyde,
p-(N-methyl-N-diethylaminoethylamino)benzaldehyde,
p-(N-ethyl-N-diethylaminoethylamino)benzaldehyde,
p-(N-n-propyl-N-diethylaminoethylamino)benzaldehyde,
p-(N-n-butyl-N-diethylaminoethylamine)benzaldehyde,
p-(N-ethyl-N-di-n-propylaminoethylamino)benzaldehyde,
p-(N-ethyl-N-di-n-butylaminoethylamino)benzaldehyde,
p-(N-ethyl-N-β-morpholinylethylamino)benzaldehyde,
p-(N-ethyl-N-γ-morpholinylpropylamino)benzaldehyde,
p-(N-ethyl-N-delta-morpholinylbutylamino)benzaldehyde,
p-(N-ethyl-N-β-piperidylethylamino)benzaldehyde,
p-(N-ethyl-N-γ-piperidylpropylamino)benzaldehyde,
p-(N-ethyl-N-delta-piperidylbutylamino)benzaldehyde,
p-(N-ethyl-N-γ-diethylaminopropylamino)benzaldehyde,
p-(N-ethyl-N-delta-diethylaminobutylamino)benzaldehyde,
p-(N-methyl-N-dimethylaminoethylamino)-2-methylbenzaldehyde,
p-(N-methyl-N-diethylaminoethylamino)-2-methylbenzaldehyde,
p-(N-ethyl-N-diethylaminoethylamino)-2-methylbenzaldehyde,
p-(N-n-propyl-N-diethylaminoethylamino)-2-methylbenzaldehyde,
p-(N-n-butyl-N-diethylmainoethylamino)-2-methylbenzaldehyde,
p-(N-ethyl-N-di-n-propylaminoethylamino)-2-methylbenzaldehyde,
p-(N-ethyl-N-di-n-butylaminoethylamino)-2-methylbenzaldehyde,
p-(N-ethyl-N-β-morpholinylethylamino)-2-methylbenzaldehyde,
p-(N-ethyl-N-γ-morpohlinylpropylamino)-2-methylbenzaldehyde,
p-(N-ethyl-N-delta-morpholinylbutylamino)-2-methylbenzaldehyde,
p-(N-ethyl-n-β-piperidylethylamino)-2-methylbenzaldehyde,
p-(N-ethyl-N-γ-piperidylpropylamino)-2-methylbenzaldehyde,
p-(N-ethyl-N-γ-diethylaminopropylamino)-2-methylbenzaldehyde,
p-(N-ethyl-N-delta-diethylaminobutylamino)-2-methylbenzaldehyde, and p - (N - ethyl - N - delta - piperidylbutylamino) - 2-methylbenzaldehyde are illustrative of the benzaldehyde compounds employed in the preparation of our new methine compounds.

The following examples illustrate the compounds of our invention and their manner of preparation.

*Example 1.—Aldehyde Preparation*

To a solution of 26.2 grams of N-n-butyl-N-β-diethylaminoethyl-m-toluidine in 20 cc. of dimethylformamide there were added slowly with stirring at 10–20° C. 11 cc. of POCl$_3$. The reaction mixture resulting was heated on the steam bath for 1.5 hours. After cooling the reaction mixture was drowned in 20 volumes of water, made slightly basic with NaOH and extracted with 100 cc. of CHCl$_3$. The extract was evaporated to dryness. p-(N-n - butyl - N - β - diethylaminoethylamino) - 2 - methylbenzaldehyde was recovered as a sticky residue and was used as such.

*Example 2*

A solution of 29 grams of the product of Example 1, 6.6 grams of malononitrile and 1 cc. of piperidine in 100 cc. of alcohol was refluxed for one hour. The reaction mixture resulting was cooled to 10° C. Yellow crystals of the desired product precipitated and were recovered by filtration, washed with cold methyl alcohol and air-dried. The product obtained has the formula:

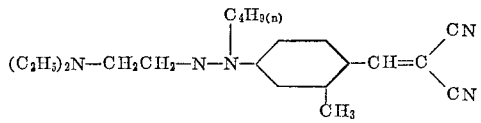

and melts at 77–78° C. It is soluble in dilute hydrochloric acid and dyes Orlon and Verel textile materials fast greenish-yellow shades.

*Example 3.—Quaternization*

Three grams of the product of Example 2, 0.5 cc. of dimethylsulfate and 5 cc. of dry chlorobenzene were stirred together at 40–50° C. After about an hour the reaction mixture was cooled to room temperature, the oil formed solidifying. The reaction product was recovered by filtration, washed with ether and dried in a vacuum desiccator. A quaternary ammonium salt form of the methine compound of Example 2 was obtained. It is water-soluble and dyes Orlon and Verel textile materials fast yellow shades.

*Example 4*

Two grams of p-(N-methyl-N-β-diethylaminoethylamino)benzaldehyde, 0.7 gram malononitrile and 5 drops of piperidine in 15 cc. of methyl cellosolve were stirred together at 50–60° C. for 2 hours. Ten cc. of methyl alcohol and 5 cc. of water were added and the reaction mixture resulting was chilled overnight at 5° C. The yellow solid which precipitated was recovered by filtration, washed with water and air-dried. It dyes acrylic and modacrylic fibers fast yellow shades.

*Example 5*

A solution of 23.4 grams of 4-(N-ethyl-N-β-dimethylaminoethylamino)-2-methylbenzaldehyde, 6.6 grams of malononitrile and 1 cc. of piperidine in 100 cc. of alcohol was refluxed for 1 hour. The reaction mixture resulting was cooled to 10° C. Yellow crystals of the desired product precipitated and were recovered by filtration, washed with cold methyl alcohol and air-dried. The methine compound thus obtained dyes Orlon and Verel textile materials fast, bright yellow shades.

*Example 6.—Quaternization*

1 gram of the product of Example 5 was heated on the steam bath for 2 hours with 5 cc. of dimethyl sulfate. After cooling, the reaction mixture was diluted with 5 volumes of ether and the product which precipitated was recovered by filtration, washed with ether and dried. A quaternary ammonium salt formed of the methine compound of the methine compound of Example 5 was obtained. It is water-soluble and dyes Verel and Orlon textile materials fast greenish-yellow shades.

*Example 7*

Example 4 was repeated using 1.38 grams of β-cyanoethyl cyanoacetate. The reaction product obtained has the formula:

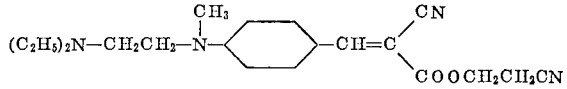

It dyes Orlon and Verel textile materials fast yellow shades.

*Example 8*

Thirty grams of 4-(N-ethyl-N-γ-morpholinopropylamino)-2-methylbenzaldehyde, 9.9 grams of methyl cyanoacetate, 1 cc. of piperidine and 100 cc. of alcohol were refluxed together for 1 hour. The reaction mixture was then diluted with hot water to incipient crystallization and cooled to room temperature while stirring. The product which precipitated was recovered by filtration, washed with water and air-dried. It dyes acrylic and modacrylic textile materials fast yellow shades.

*Example 9*

In Example 1, the amine used was 28.2 g. of 4-N-ethyl-N-(N',N'-di-β-cyanoethylamino)ethyl-m - toluidine. 15.6 g. (0.05 m.) of the product were treated with 3.3 g. of malononitrile and 5 drops of piperidine in 50 cc. of alcohol as in Example 2. The product dyes Orlon and Verel textiles in bright yellow shades.

*Example 10*

5 g. of the product of Example 9, 5 g. of methyl iodide and 50 cc. of ether were mixed and allowed to stand at room temperature for 72 hours. The solid was filtered off, washed and dried. It dissolves in warm water and imparts fast greenish-yellow shades to Orlon and Verel textiles.

*Example 11*

In Example 2 the aldehyde used was 25.8 g. of 4-(N-ethyl-N-β-diethylamino) - 2 - methylbenzaldehyde. The product dyes Verel and Orlon textiles yellow shades. When treated as in Example 3, a water-soluble yellow dye is formed.

*Example 12*

1 g. of the unquaternized dye of Example 11, 1 g. of ethyl p-toluenesulfonate and 7 cc. of dry benzene were stirred at 40–50° C. for 2 hours. The yellow solid was filtered off, washed with ether and air-dried. The product dyes acrylic fibers in bright greenish-yellow shades.

*Example 13*

(A) 160 g. of N'-methylaniline and 85.5 g. of N,N-aminoethylamino)-benzaldehyde, 6.6 g. of malononitrile and 1 cc. of piperidine in 108 cc. of methyl cellosolve was heated on the steam bath for one hour. Water was added to incipient crystallization and the flask chilled to 5° C. The bright yellow product was filtered off, washed with cold methanol and air-dried. It dyes acrylic fibers in fast greenish-yellow shades.

*Example 14.—Preparation of Anilines*

(A) 160 g. of N'-methylaniline and 85.5 g. of N,N-diethylaminoethyl chloride hydrochloride were heated and stirred at 120° C. for 21 hours. After cooling, the mixture was poured into a solution of 60 g. of NaOH in 1 liter of water. The organic layer was separated off and distilled, collecting the fraction boiling at 124–6° C./5 mm.

(B) To 53.4 g. of N-ethyl-N-β-aminoethyl-m-toluidine, 2 cc. of acetic acid and 50 cc. of toluene there was added in the course of 30 minutes 40 g. of acrylonitrile. After addition the mixture was heated 6 hours on the steam bath. The volatiles were removed in a rotary vacuum evaporator. The thick viscous residue was used to make the aldehyde without further treatment.

(C) To a slurry of 35.6 g. of N-ethyl-N-β-aminoethyl-m-toluidine in 250 cc. of water and 16 g. of NaOH there was added 50.4 g. of dimethyl sulfate at such a rate that the temperature did not exceed 50° C. The mix was then heated 1.5 hours on the steam bath, cooled and extracted with chloroform. The chloroform extract was evaporated as in B.

Other substituted anilines having the following formula may be used:

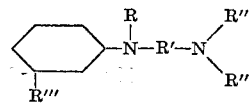

wherein R, R', R'' and R''' represent the radicals tabulated below:

| R''' | R | R' | $-N\begin{matrix}R''\\R''\end{matrix}$ |
|---|---|---|---|
| —H | —C$_2$H$_5$ | —CH$_2$CH$_2$CH$_2$— | —N(CH$_3$)(CH$_3$) |
| —CH$_3$ | —CH(CH$_3$)$_2$ | —CH$_2$CH$_2$— | —N(CH$_2$—CH$_2$)(CH$_2$—CH$_2$)CH$_2$ |
| —CH$_3$ | —C$_2$H$_5$ | —CH(CH$_3$)—CH$_2$— | —N(C$_2$H$_5$)(C$_2$H$_5$) |
| —CH$_3$ | —CH$_2$CH$_2$CH$_3$ | —CH$_2$CH$_2$CH$_2$CH$_2$— | —N(CH$_3$)(CH$_3$) |
| —CH$_3$ | —C$_2$H$_5$ | —CH$_2$CH$_2$— | —N(CH$_2$—CH$_2$)(CH$_2$—CH$_2$)O |
| —CH$_3$ | —C$_2$H$_5$ | —CH$_2$CH$_2$— | —N(CH$_2$CH$_2$CH$_3$)(CH$_2$CH$_2$CH$_3$) |

*Example 15.—Preparation of Quaternary Aldehyde*

To a solution of 21.4 g. of the product of 14(C) in 20 cc. of dimethyl formamide at 0° C. there was added 10 cc. of POCl$_3$ below 20° C. After addition the solution was heated 2 hours on the steam bath. After cooling, the mix was poured into one liter of water. The organic layer was taken up in CHCl$_3$ and dried over Na$_2$SO$_4$ and the solvent removed by distillation. The residue was a viscous oil.

11.7 g. of this product, 6.3 g. of dimethyl sulfate and 20 cc. of benzene were refluxed 1.5 hours. After cooling, the viscous gum was washed well by decantation and air dried. The product is completely water soluble.

*Example 16.—Dyeing of Acrylic Fibers*

(A) *Unquaternized dye.*—16.7 mg. of the dye of Example 2 was dissolved by warming in 5 cc. of methyl cellosolve. Twenty-five cc. of a 2% solution of sodium lignin sulfonate was added and the bath brought to 200 cc. with hot water. Five cc. of a 10% solution of formic acid was added followed by 5 g. of Orlon 42 fabric. The bath was brought to the boil and held one hour. After rinsing and drying there results a bright greenish-yellow fabric of excellent resistance to the action of light.

(B) *Quaternized dye.*—16.7 mg. of the dye of Example 3 was added to 200 cc. of hot water. Five cc. of 10% formic acid was added followed by 5 g. of Orlon 42. The bath was brought to the boil and held one hour. The dried fabric is a bright greenish yellow of excellent fastness properties.

The invention has been described in considerable detail with particular reference to certain preferred embodiments thereof, but it will be understood that variations and modifications can be effected within the spirit and scope of the invention as described hereinabove and as defined in the appended claims.

We claim:

1. The methine compound having the formula:

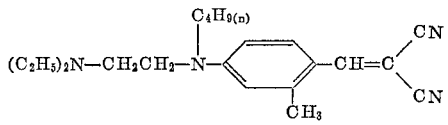

2. The methine compound having the formula:

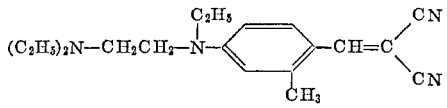

3. The methine compound having the formula:

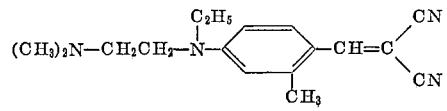

4. The methine compound having the formula:

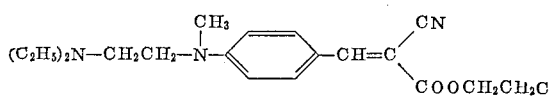

5. The methine compound having the formula:

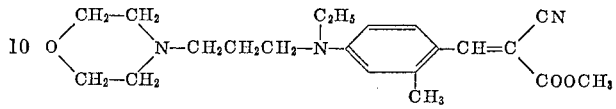

6. A methine compound selected from the group consisting of the methine compounds having the formula

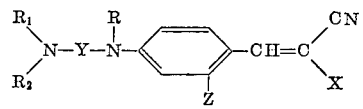

wherein R and $R_1$ each represents alkyl of 1 to 4 carbon atoms, $R_2$ represents a member selected from the group consisting of alkyl of 1 to 4 carbon atoms and β-cyanoethyl, Y represents alkylene of 2 to 4 carbon atoms, X represents a member selected from the group consisting of cyano, —$COOCH_2CH_2CN$ and —$COOR_3$, wherein $R_3$ represents alkyl of 1 to 4 carbon atoms, Z represents a member selected from the group consisting of hydrogen and methyl, and in

$R_1$ and $R_2$ form, together with the nitrogen atom, a member selected from the group consisting of morpholino and piperidino.

References Cited in the file of this patent

UNITED STATES PATENTS 2,789,125    Kartinos et al. _____ Apr. 16, 1957

UNITED STATES PATENT OFFICE
CERTIFICATE OF CORRECTION

Patent No. 3,141,018                     July 14, 1964

James M. Straley et al.

It is hereby certified that error appears in the above numbered patent requiring correction and that the said Letters Patent should read as corrected below.

Column 8, lines 3 to 6, right-hand portion of the formula, for

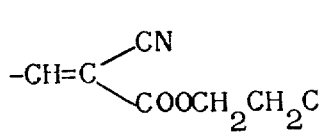     read     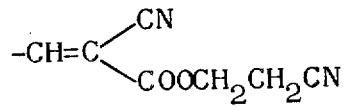

Signed and sealed this 9th day of February 1965.

(SEAL)
Attest:

ERNEST W. SWIDER
Attesting Officer

EDWARD J. BRENNER
Commissioner of Patents